United States Patent [19]

Udagawa

[11] Patent Number: 5,570,892
[45] Date of Patent: Nov. 5, 1996

[54] METAL GASKET WITH A BEAD HAVING PRESSURE ADJUSTING PORTION

[75] Inventor: Tsunekazu Udagawa, Ichikawa, Japan

[73] Assignee: Ishikawa Gasket Co., Ltd., Tokyo, Japan

[21] Appl. No.: 495,348

[22] Filed: Jun. 27, 1995

[51] Int. Cl.$^6$ ........................ F16J 15/08
[52] U.S. Cl. ........................ 277/235 B
[58] Field of Search ............... 277/235 B, 236

[56] References Cited

U.S. PATENT DOCUMENTS

| | | |
|---|---|---|
| 4,721,315 | 1/1988 | Ueta .................... 277/235 B |
| 4,759,556 | 7/1988 | Udagawa . |
| 5,149,110 | 9/1992 | Inamura . |
| 5,269,541 | 12/1993 | Inamura . |
| 5,344,165 | 9/1994 | Miyaoh et al. . |
| 5,382,029 | 1/1995 | Udagawa et al. .......... 277/235 B |
| 5,427,389 | 6/1995 | Ishikawa et al. ......... 277/235 B |

Primary Examiner—Scott Cummings
Attorney, Agent, or Firm—Kanesaka & Takeuchi

[57] ABSTRACT

A metal gasket of the invention is used as a cylinder head gasket or a manifold gasket. The gasket is formed of a metal plate for constituting a metal gasket, at least one fluid hole, a plurality of bolt holes, and a bead formed in the metal plate to completely surround the fluid hole for sealing the same. The bead includes a waving portion at a portion where high pressure is applied when the engine is operated, and a non-waving portion. The waving portion has a covering area greater than that at the non-waving portion. Therefore, the waving portion can support pressure without creep relaxation.

9 Claims, 1 Drawing Sheet

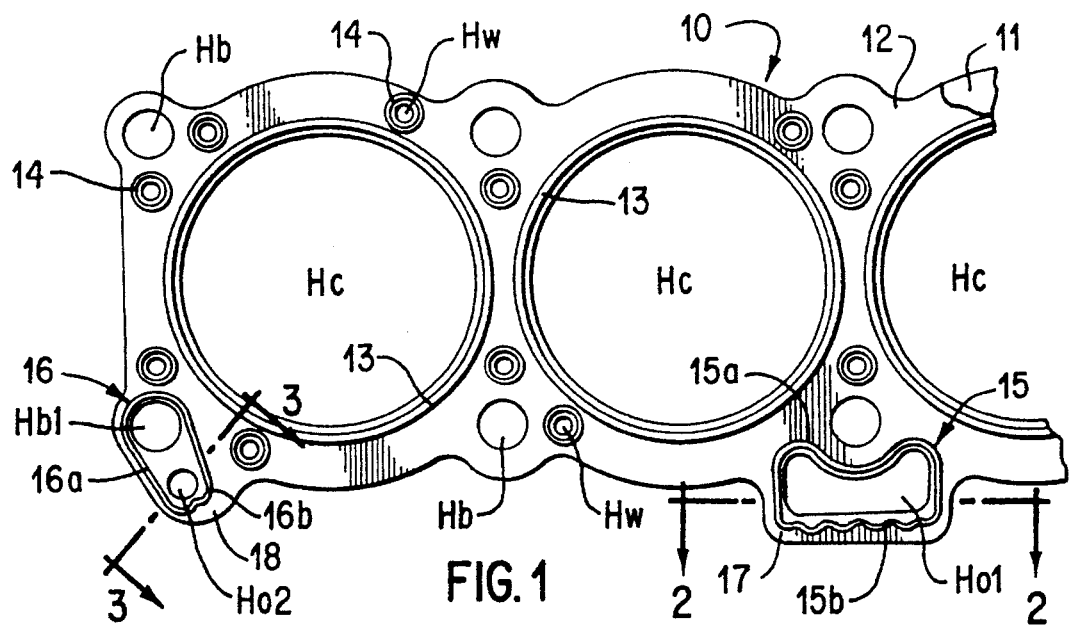
FIG. 1
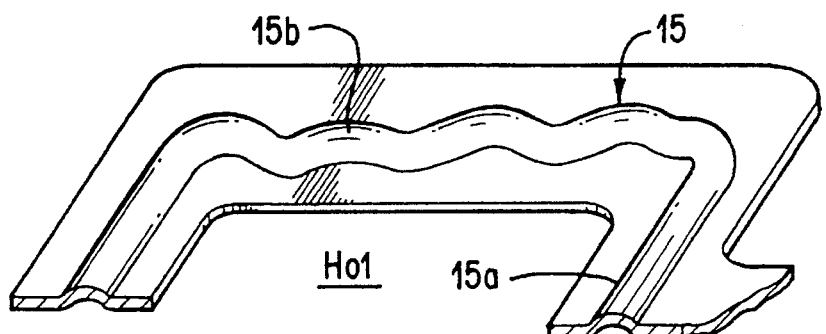
FIG. 2
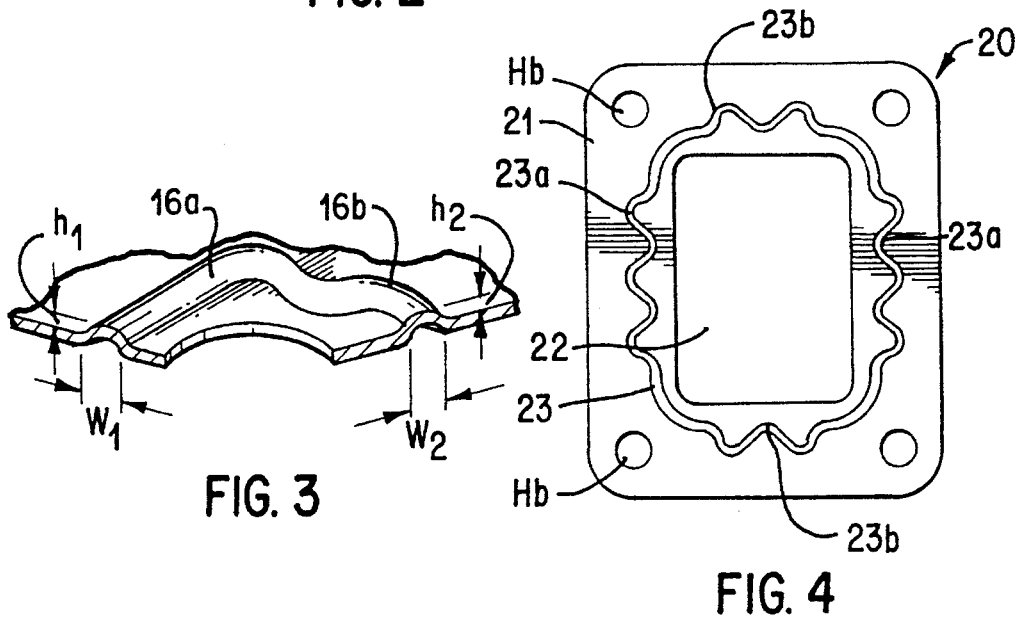
FIG. 3
FIG. 4

METAL GASKET WITH A BEAD HAVING PRESSURE ADJUSTING PORTION

BACKGROUND OF THE INVENTION AND RELATED ART STATEMENT

The present invention relates to a metal gasket for an internal combustion engine, more particularly a metal gasket with a bead having pressure adjusting portion to adjust pressure applied to the bead.

A metal gasket is installed between two engine parts, and is tightened by a plurality of bolts therebetween. Since the bolts are not arranged equally over the entire area of the engine parts, the tightening pressures applied onto the gasket by the bolts are partly different.

Especially, in a cylinder head gasket, the bolts are arranged around cylinder bores to seal therearound by sealing devices as equal as possible. Although other sealing devices are formed around other holes, such as water holes and oil holes, the sealing pressures for other holes are not generally considered. Even if the sealing pressures for other holes are considered, since many other holes are formed outside the cylinder bores, the other sealing devices can not receive substantially equal tightening pressure from the bolts. Therefore, although the sealing devices are desirably tightened as equal as possible, the sealing devices are not equally tightened.

In order to solve the above problems, U.S. Pat. Nos. 5,149,110, 5,269,541 and 5,344,165 were proposed, wherein the spring constant of the beads formed around the fluid holes is changed with reference to the location of the fluid holes and the beads in the gasket.

In U.S. Pat. No. 4,759,556, a bead between two bolt holes is provided with an auxiliary bead to increase surface pressure between the two bolt holes, i.e. two beads are partly formed. Therefore, the surface pressure of the bead at the portion between the two bolt holes can be increased.

The prior patents as explained above operate generally as intended. However, it is still desirable to improve the gasket.

On the other hand, in case a surface pressure of a gasket is partly increased, a surface pressure regulation plate or small tip of a plate is piled on the gasket. In this respect, it is desirable to provide a device to easily adjust surface pressure of the gasket.

Accordingly, one object of the invention is to provide a metal gasket with a bead, wherein the bead can widely support a pressure applied thereto.

Another object of the invention is to provide a metal gasket as stated above, wherein the bead can provide an extra surface pressure where high pressure is applied.

A further object of the invention is to provide a metal gasket as stated above, wherein creep relaxation of the bead is prevented.

Further objects and advantages of the invention are apparent from the following description of the invention.

SUMMARY OF THE INVENTION

In accordance with the present invention, a metal gasket is used for an internal combustion engine and is situated between two engine parts. The gasket can be used for a cylinder head gasket or a manifold gasket.

The metal gasket is formed of a metal plate for constituting the metal gasket, and includes at least one fluid hole and a plurality of bolt holes. A bead is formed in the metal plate to completely surround the fluid hole for sealing the same. In the invention, the bead has a waving portion formed at a portion where high pressure is applied when the engine is operated, and a non-waving portion. The waving portion has a covering area greater than that at the non-waving portion so that the waving portion can support pressure without creep relaxation.

The waving portion and non-waving portion receive low and high tightening pressure respectively when the gasket is tightened between the engine parts. The waving portion provides surface pressure greater than that at the non-waving portion.

In the invention, the covering area by the bead is increased at the waving portion, so that the bead at the waving portion supports the tightening pressure widely.

The bead at the non-waving portion extends generally along the fluid hole, and it may be curved or extend linearly.

The waving portion is located at a portion where a movement in a compressing direction of the gasket is large. Generally, the waving portion is located at a peripheral side of the gasket and away from the bolt holes. The spring constant of the bead at the waving portion is greater than that at the non-waving portion.

BRIEF DESCRIPTION OF THE DRAWINGS

FIG. 1 is a plan view of a part of a first embodiment of the present invention applied to a cylinder head gasket;

FIG. 2 is an enlarged perspective section view taken along a line 2—2 in FIG. 1;

FIG. 3 is an enlarged perspective section view taken along a line 3—3 in FIG. 1; and FIG. 4 is a plan view of a second embodiment of the invention applied to a manifold gasket.

DETAILED DESCRIPTION OF PREFERRED EMBODIMENTS

Referring to FIGS. 1–3, a first embodiment of the present invention is shown. The gasket 10 as shown in the first embodiment is a cylinder head gasket formed of an upper plate 11, and a lower plate 12 situated under the upper plate 11. The gasket 10 includes a plurality of cylinder bores Hc, water holes Hw, and bolt holes Hb, as in the conventional cylinder head gasket. Beads 13, 14 are formed in the plate 12 around the cylinder bores Hc and water holes Hw to seal therearound.

The gasket 10 also includes oil holes Ho1, Ho2, and beads 15, 16 formed around the oil holes Ho1, Ho2. Since the oil holes Ho1, Ho2 are situated around the periphery of the gasket 10, i.e. outside the bolt holes Hb, the beads 15, 16 for the oil holes Ho1, Ho2 are prepared in accordance with the present invention.

The bead 15 includes an inner portion 15a formed at an inner side of the gasket, and an outer portion 15b facing outwardly of the gasket. The inner portion 15a extends along an inner shape of the oil hole Ho1, but the outer portion 15b is waved in a space 17 between the oil hole Ho1 and the outer edge of the gasket. Since the outer portion 15b is waved, the length of the bead 15 at the outer portion 15b increases. Namely, an area that the outer portion 15b of the bead occupies or covers in the space 17 between the oil hole Ho1 and the outer edge is increased.

In the cylinder head gasket, in case the outer edge portion outside the bolt hole projects outwardly beyond the normal outer shape of the gasket, like the space 17 shown in FIG.

1, such projected outer edge portion vibrates severely. Especially, the outer portion 15b of the bead 15 vibrates up and down vertically, so that creep relaxation may occur at the outer portion 15b.

However, in the present invention, since the outer portion 15b is waved to increase the pressure receiving area at the space 17, load relative to a unit area decreases. Therefore, creep relaxation at the outer portion 15b of the bead 15 is reduced or prevented, so that sealing at the outer portion 15b can be made properly. Oil leakage is therefore prevented.

The oil hole Ho2 is also formed at the edge of the gasket 10 outside the bolt hole Hb1, and slightly projects outwardly. In this case, the bead 16 is formed to surround the bolt hole Hb1 and the oil hole Ho2. The bead 16 includes a main portion 16a, and an outer portion 16b at a side away from the bolt hole Hb1.

The main portion 16a includes a curved portion near the bolt hole Hb1 and two linear portions extending toward the oil hole Ho2. The size of the main portion 16a is substantially the same throughout the entire length thereof. The outer portion 16b is waved to increase the pressure receiving area at a portion 18, where the gasket vibrate severely. The height h2 of the outer portion 16b is the same as the height h1 of the main portion 16a, but the width w2 is shorter than the width w1 of the main portion 16a. Therefore, the outer portion 16b provides surface pressure stronger than that at the main portion 16a. Namely, the outer portion provides strong surface pressure because of the width and the waving shape.

In the gasket 10, the parts of the gasket located outside the bolt holes project especially outwardly, but the beads formed at the parts have the specific waving shape or portions to widely support the force applied thereto. In other words, the area where a large pressure is applied has the specific bead shape to widely support the load applied thereto. Thus, creep relaxation of the bead is prevented.

FIG. 4 shows a second embodiment 20 of the invention. The gasket 20 is a manifold gasket situated between a manifold and a cylinder head. The gasket 20 is formed of a single plate 21, and includes a manifold hole 22, four bolt holes Hb and a bead 23 surrounding the hole 22. The bead 23 includes waving portions 23a, 23b between bolt holes Hb where high tightening pressures by the bolts are not applied.

In the invention, since the waving portion 23a or 23b is formed at each portion between the two bolt holes Hb, the pressure receiving area between the two bolt holes increases. Although the middle portion between the two bolt holes can not receive sufficient tightening pressure from the bolts, since the pressure receiving area is increased by the waving portion, it is possible to provide a large surface pressure at the middle portion. Therefore, the bead 23 around the hole 22 can provide substantially equal surface pressure.

In the present invention, the surface pressure at a required portion can be increased freely by forming the waving portions. Also, the number of the projecting portions of the waving portion and the shape can be selected freely, so that the surface pressure can be controlled as desired.

While the invention has been explained with reference to the specific embodiments of the invention, the explanation is illustrative and the invention is limited only by the appended claims.

What is claimed is:

1. A metal gasket for an internal combustion engine situated between two engine parts, comprising, a metal plate for constituting a metal gasket, at least one fluid hole situated in the metal plate, a plurality of bolt holes situated in the metal plate for allowing bolts to pass therethrough, and a bead formed in the metal plate to completely surround the fluid hole for sealing the same, said bead having a waving portion and a non-waving portion, said waving portion being formed of only said bead and having at least one curved portion facing and approaching the fluid hole, said waving portion curving differently from a contour of the fluid hole and being formed at a portion where movements in compressing directions of the gasket are large when the engine is operated, said waving portion having a covering area by the bead wider than that at the non-waving portion so that the waving portion can support pressure to reduce creep relaxation and wherein said bead consists essentially of one bead continuously surrounding the fluid hole without a branch.

2. A metal gasket according to claim 1, wherein said waving portion and non-waving portion receive low and high tightening pressure respectively when the gasket is tightened between the engine parts, said waving portion providing surface pressure greater than that at the non-waving portion.

3. A metal gasket according to claim 2, wherein said waving portion is located at a peripheral side of the gasket and away from the bolt holes.

4. A metal gasket according to claim 1, wherein spring constant of the bead at the waving portion is greater than that at the non-waving portion.

5. A metal gasket according to claim 4, wherein the waving portion of the bead has a width less than that at the non-waving portion.

6. A metal gasket according to claim 2, wherein said waving portion is located between two bolt holes.

7. A metal gasket according to claim 2, wherein said fluid hole includes a linear edge portion extending linearly, said waving portion being formed along the linear edge portion.

8. A metal gasket according to claim 1, wherein said waving portion consists essentially of said one curved portion, and two curved edges extending from said one curved portion at both sides thereof.

9. A metal gasket according to claim 1, wherein said waving portion includes a plurality of said curved portions.

* * * * *